United States Patent [19]
Green et al.

[11] Patent Number: 5,087,911
[45] Date of Patent: Feb. 11, 1992

[54] DATA COMMUNICATION NETWORK

[75] Inventors: Howard Green, Coventry; Anthony P. Lumb, Nuneaton, both of England

[73] Assignee: GEC Plessey Telecommunications Limited, England

[21] Appl. No.: 209,338

[22] Filed: Jun. 20, 1988

[30] Foreign Application Priority Data

Jun. 19, 1987 [GB] United Kingdom ............... 8714388

[51] Int. Cl.⁵ ............................................. H04Q 3/00
[52] U.S. Cl. ........................... 340/825.05; 340/825.01; 370/85.5; 370/85.15
[58] Field of Search ............ 340/825.01, 825.05, 340/827; 371/11.1, 11.2, 20.6; 370/16.1, 85.5, 85.12, 85.15

[56] References Cited

U.S. PATENT DOCUMENTS 4,354,267 10/1982 Mori et al. ....................... 371/11
4,434,463 2/1984 Quinquis et al. ................ 370/88 X
4,817,088 3/1989 Adams ............................. 370/88

FOREIGN PATENT DOCUMENTS 0028532 3/1981 Japan ................................ 371/11

Primary Examiner—Ulysses Weldon
Attorney, Agent, or Firm—Kirschstein, Ottinger, Israel & Schiffmiller

[57] ABSTRACT

A data communications network comprises a plurality of terminals (30, 31, ... 34) which are interconnected by a contra-rotative ring pair of lines (35, 36), so as to be able to send data to and receive data from all the other terminals in the network. Each terminal has a pair of stations (A, B), each linked to said pair. The network is characterized in that one station associated with any one terminal is arranged to be as distant as possible in a topological sense from its associated pair.

4 Claims, 2 Drawing Sheets

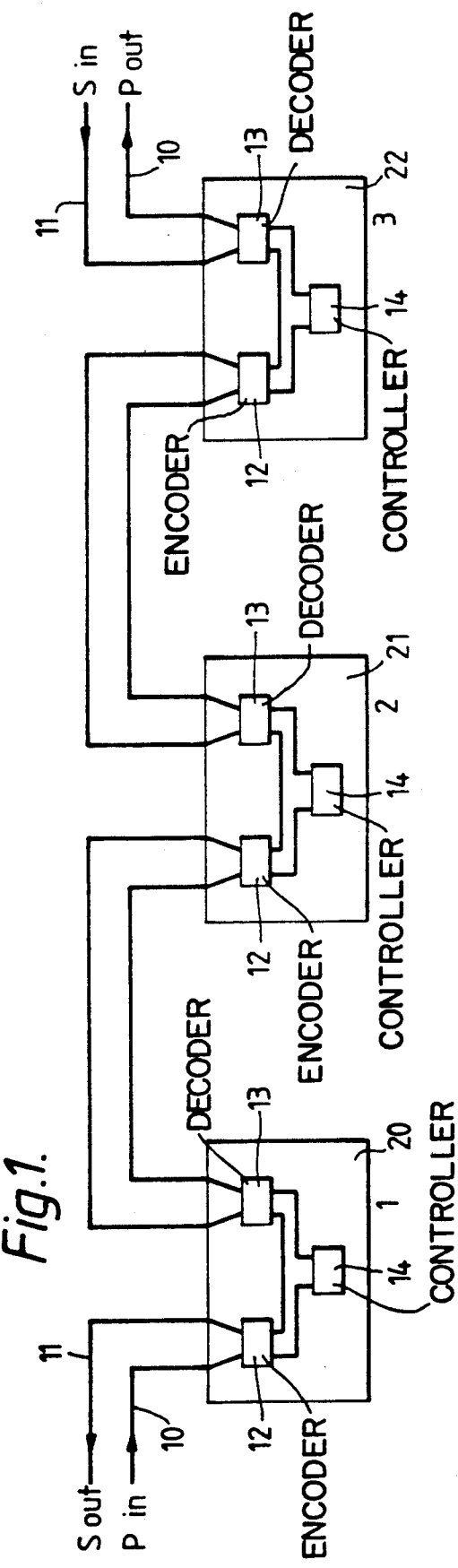
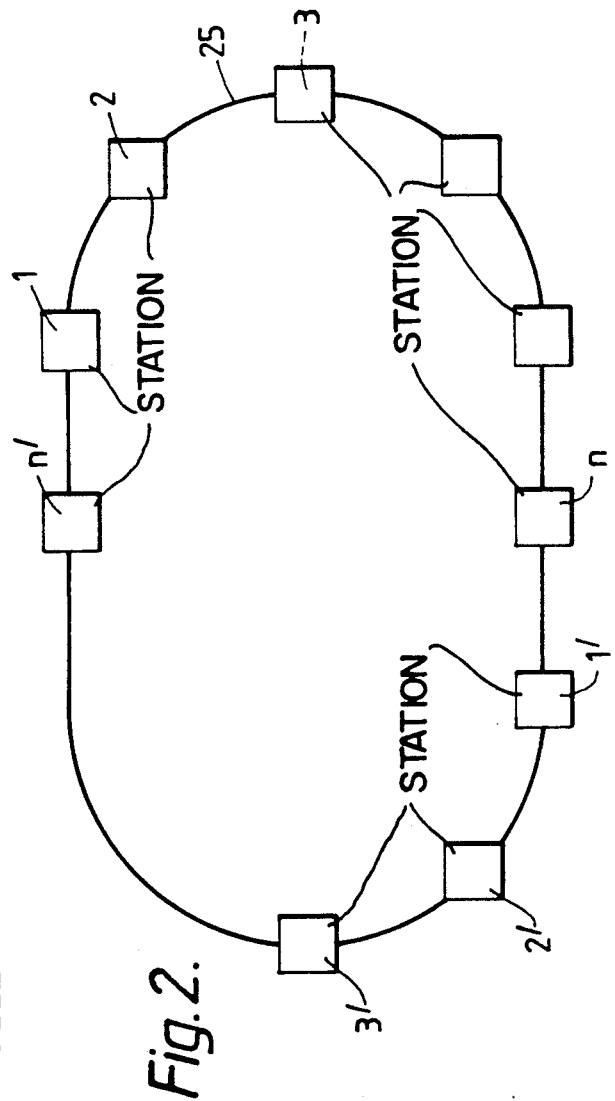

DATA COMMUNICATION NETWORK

BACKGROUND OF THE INVENTION

1. Field of the Invention

The present invention concerns communication systems in which data can be transferred between a plurality of stations.

2. Description of Related Art

Existing central control architecture for such systems of which an example is System X offers essentially two communication interfaces. These are intercluster serial communications and the parallel direct 1/0. These interfaces correspond to the traditional separation of control elements from applications hardware. In this traditional view there are small numbers of complex, expensive control elements controlling large numbers of simple, cheap peripherals. A symmetric asynchronous message interface is provided between the data processing control elements, and these elements in turn communicate with application hardware via a synchronous low-level word by word mechanism. Thus the application hardware elements can only communicate with each other via the control elements.

With the development of cheap processing power this architecture is not suited to modern requirements and has become a constraint on future evolution. In particular the availability of microprocessors and cheap memory has made it much simpler to enhance the capability of peripheral devices so that more and more functions are being located at the peripherals. Thus a typical interaction between a control element and a peripheral now requires tens of bytes of parameter information. Moreover since the peripheral does much more the length of the interaction has increased. In order to carry this increased traffic using current interfaces there has now been implemented asynchronous message passing arrangements on top of the message passing mechanisms which were already provided. This is inefficient in that it holds up both ends of the communication more than necessary and requires a wholly unnecessary speed of response from the peripherals. Furthermore there is now, and in the future this will increase substantially, a growth in traffic transmitted between peripherals. In this context the central control becomes a bottleneck.

In view of the above it is probable that future systems will involve a large number of duplicated stations which are capable of exchanging messages of fairly similar lengths asynchronously, on a peer-to-peer basis and at high rates.

In such a system the number of terminals is likely to be over 100 with the possibility of handling still more. There are two alternative basic architectures which can be used. One is a star-network and the other involves a ring topology. Star-type topologies have great difficulties with high numbers of stations at the required bandwidth, and are vulnerable to failure of the central control element. On the other hand the ring topology presents the problem that one failure in a simple ring can be fatal. There have been a number of proposals to overcome this problem since the functioning of the whole system depends on the reliability of the ring.

One method of increasing reliability is to have two concentric ring structures with each terminal being capable of communicating with both rings so that should one ring fail the other can take over its function. Normally the rings operate in a contra-rotating mode with the data in one ring being transmitted in a direction opposite to the direction of transmission in the other ring. The ring topology is particularly suited to the transmission of data by optical fibre although the present invention is not limited solely to optical rings. In such a topology one channel or ring is known as the primary channel and the other as the secondary or reserve.

SUMMARY OF THE INVENTION

The present invention is concerned with providing a ring topology which is relatively simple yet which is capable of withstanding an even greater degree of failure than the above mentioned concentric ring network.

Accordingly the present invention consists in a data communications network comprising a plurality of terminals which are interconnected by a contra-rotative ring pair of lines so as to be able to send data to and receive data from all other terminals on the network, and wherein each terminal has a pair of stations each linked to said line pair, and wherein one station associated with any one terminal is arranged to be as distant as possible in a topological sense from its associated pair.

DESCRIPTION OF THE DRAWINGS

In order that the present invention may be more readily understood, an embodiment thereof will now be described by way of example and with reference to the accompanying drawings in which:

FIG. 1 is a diagram showing part of a known ring structure according to the prior art;

FIG. 2 is a diagram showing an embodiment of a ring structure according to the present invention.

DETAILED DESCRIPTION OF THE PREFERRED EMBODIMENT

Figure 3:
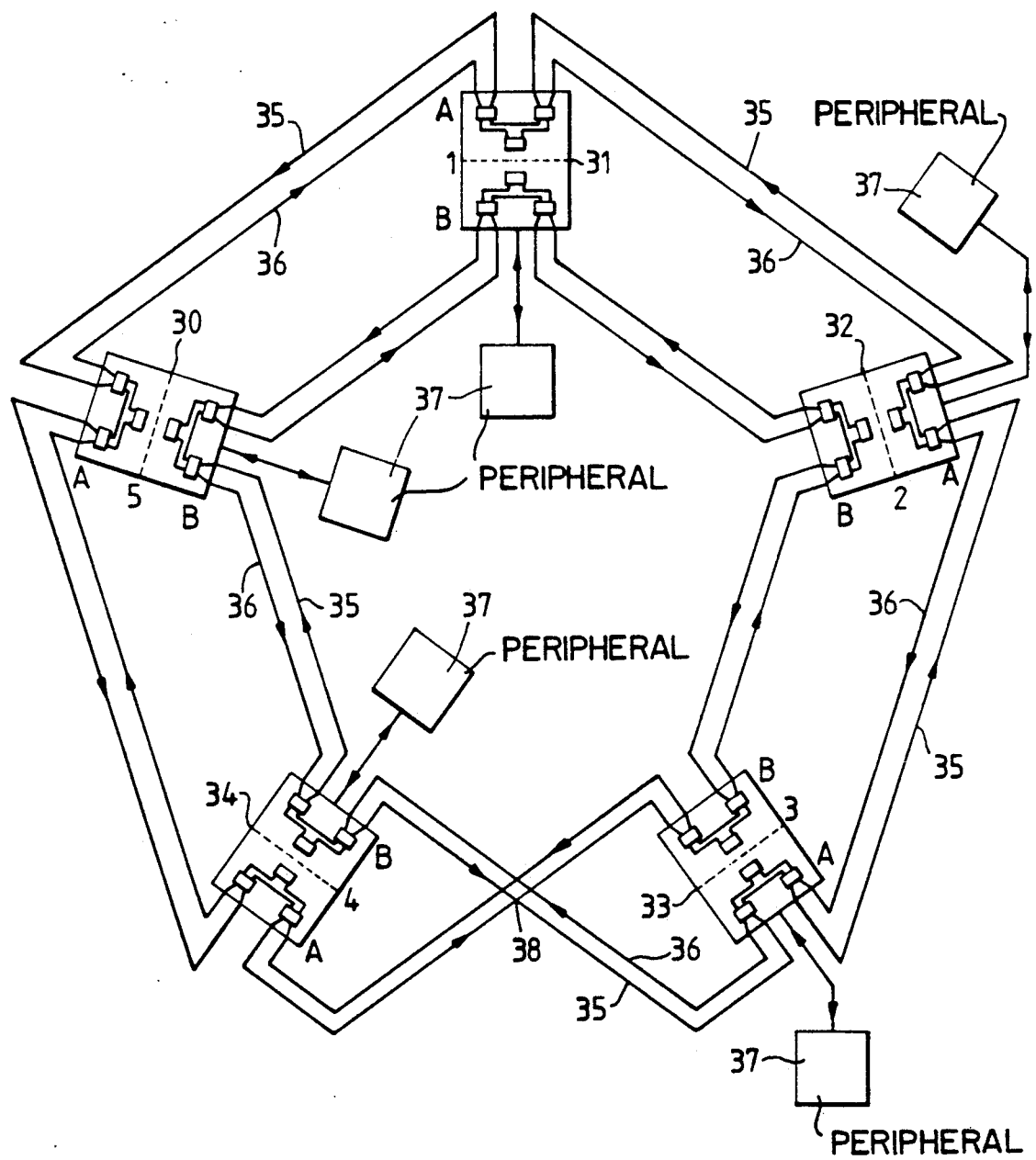
FIG. 3 is a block diagram of a contra-rotating optical ring network according to the present invention.

There are a number of factors to be considered when implementing ring-type data networks. For example the total length for such a ring may be of the order of one or two kilometers. As a result existing Ethernet-type local area networks (LANS) are clearly inadequate, even if they could be made sufficiently reliable.

Furthermore the likelihood is that any system will have to comply with stringent requirements for electromagnetic interference and susceptibility. Thus the system being described is an optical LAN which utilises "cabinetized" equipment. One such system has already been proposed. This is known as the American National Standards Institute Fibre Distributed Data Interface (FDDD-1). This standard describes a 100 megabit optical fibre contra-rotating ring pair. The basic features of such an arrangement are shown in FIG. 1 of the accompanying drawings which shows part of a known contra-rotating optical ring network. The network comprises two optical fibre paths 10, 11 of which 10 is the primary data path and 11 the secondary or reserve data path. The paths 10, 11, interconnect a plurality of nodes or terminals of which only three are shown in the Figure. These are numbered 20, 21 and 22 and each includes a pair of encoders/decoders 12 and 13 and a Media Access Controller 14 (MAC). It is via the MACs 14 that peripheral equipments associated with the terminals can send or receive messages onto the primary ring 10 or secondary ring 11.

Referring now to FIG. 2 of the drawings this shows in a basic, diagrammatic form a ring topology in accordance with the present invention and which has a much higher degree of fault tolerance. In this system each user has two stations associated with it interconnected by a line 25 which represents a contra-rotating ring pair. Each station is capable of operating independently if the other station fails. In FIG. 2 there are n user terminals with each terminal having two stations. The pairs of stations are marked 1, 1'2, 2' . . . n, n' with similar reference numerals indicating paired stations serving the same terminal. Because of the diagrammatic nature of FIG. 2 it is not feasible to show the terminals associated with the stations. As can be seen from FIG. 2, the stations of each pair are arranged so as to be separated by as great a distance as is possible in a topological sense. It is for this reason that the difficulty in illustrating the terminals occurs. Thus between stations 1 and 1' there is located all the stations 2 to n. However this does not mean that in a spatial sense pairs of stations serving the same terminal need to be separated by any great distance no matter the extent of the network being served by them. This is achieved in the manner shown on FIG. 3. FIG. 3 shows a contra-rotating optical ring network according to the present invention. The ring consists of five dual access nodes 30-34 interconnected by a pair of lines 35 and 36. Each node 30-34 has two identical access Stations A and B, with each access station corresponding to those shown in FIG. 1. It will be appreciated that the number of nodes can be considerably higher. Each node is associated with an individual terminal 37 consisting of peripheral equipment so that the equipment can access the optical lines 35, 36 either through its station A or through Station B. In a topological sense, as in the diagram of FIG. 2, each associated pair of access stations are spaced apart by half the perimeter of the total ring. However the ring is twisted into a Mobius form at 38 thus allowing the topologically spaced access stations A and B of each node to be physically adjacent.

The effect of the topology shown in FIGS. 2 and 3 on potential reliability is considerable. For example a double failure, fatal in the FIG. 1 configuration, merely partitions the main ring into two independent subrings. However, in one of these subrings a complete set of 1 to n or 1' to n' stations will remain in communication. Naturally the failure of one pair of associated stations will isolate that terminal from the others although this is true for any interconnection scheme in which users have duplicated access.

Not only are double failures not fatal but in fact almost 75% of triple failures are also non-fatal. Furthermore a failure of all of one of the subsets of stations leaves the other subset still in full communication. This can be of advantage when it is required, for example, to enhance the system.

Making conservative assumptions it is believed that a ring of the kind described in FIGS. 2 and 3 is very adequately reliable for at least 50 users.

We claim:

1. A fault-tolerant data communications network, comprising:
   (a) a plurality of user terminals, each terminal having two stations, each station being independently operable and having means for receiving data and means for transmitting data;
   (b) ring means having a signal path along which the terminals are electrically interconnected, said ring means including a primary data line electrically interconnecting one station of each terminal for routing data in one direction around the ring means, and a secondary data line electrically interconnecting another station of each terminal for routing data in an opposite direction around the ring means;
   (c) said one station and said other station of each terminal being physically located adjacent each other at a particular terminal site on the ring means; and
   (d) said one station and said other station of each terminal being electrically interconnected at opposite ends of a portion of the signal path, along which path portion are located half of the remaining stations of the network.

2. The network according to claim 1, wherein the primary and secondary data lines are twisted into a Mobius form at a predetermined location on the ring means.

3. The network according to claim 1, wherein the lines are optical fibres.

4. The network according to claim 1, wherein the means for receiving data and the means for transmitting data include an encoder, a decoder and a controller for interfacing between a peripheral device at a respective terminal and at least one of the data lines.

* * * * *